(12) United States Patent
Luca et al.

(10) Patent No.: US 9,593,425 B2
(45) Date of Patent: Mar. 14, 2017

(54) CONFINEMENT OF REACTION COMPONENTS AT ELECTRODE SURFACE

(71) Applicant: The California Institute of Technology, Pasadena, CA (US)

(72) Inventors: Oana R. Luca, Pasadena, CA (US); Raymond Weitekamp, Glendale, CA (US); Robert H. Grubbs, South Pasadena, CA (US); Harry A. Atwater, South Pasadena, CA (US); Slobodan Mitrovic, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 245 days.

(21) Appl. No.: 14/603,332

(22) Filed: Jan. 22, 2015

(65) Prior Publication Data

US 2015/0203977 A1    Jul. 23, 2015

Related U.S. Application Data

(60) Provisional application No. 61/930,247, filed on Jan. 22, 2014, provisional application No. 62/051,208, filed on Sep. 16, 2014, provisional application No. 61/938,497, filed on Feb. 11, 2014, provisional application No. 62/051,644, filed on Sep. 17, 2014, provisional application No. 62/051,789, filed on Sep. 17, 2014.

(51) Int. Cl.
*C25B 11/00* (2006.01)
*C25B 3/04* (2006.01)
*C25B 11/04* (2006.01)

(52) U.S. Cl.
CPC ............ *C25B 3/04* (2013.01); *C25B 11/0405* (2013.01); *C25B 11/0489* (2013.01)

(58) Field of Classification Search
CPC  C25B 3/04; C25B 11/00; C25B 11/04; C25B 11/0405; C25B 11/0442; C25B 11/0478; C25B 11/0489; H01M 4/00; H01M 4/02; H01M 4/137; H01M 4/13–4/602; H01M 4/86; H01M 4/90; H01M 4/9008
See application file for complete search history.

(56) References Cited

U.S. PATENT DOCUMENTS

2011/0127515 A1\*   6/2011   Miyake ................ C08G 61/123
                                                        257/40

OTHER PUBLICATIONS

Zhang et al (Chemical Science, 2013, 4, 3395-3403).\*
Benitez et al (Organometallics, 2009, 28, 2643-2645).\*

\* cited by examiner

*Primary Examiner* — Luan Van
*Assistant Examiner* — Alexander W Keeling
(74) *Attorney, Agent, or Firm* — Joseph R. Baker, Jr.; Gavrilovich, Dodd & Lindsey LLP

(57) ABSTRACT

A $CO_2$ reduction electrode includes an active layer on an electrode base. The active layer includes a polymer that includes one or more reaction components selected from a group consisting of a $CO_2$ reduction catalyst and an activator that bonds $CO_2$ so as to form a $CO_2$ reduction intermediate.

18 Claims, 6 Drawing Sheets

CONFINEMENT OF REACTION COMPONENTS AT ELECTRODE SURFACE

CROSS REFERENCE TO RELATED APPLICATIONS

This application claims the benefit of U.S. Provisional Patent Application Ser. No. 61/930,247, filed on Jan. 22, 2014, and incorporated herein in its entirety; and this application also claims the benefit of U.S. Provisional Patent Application Ser. No. 62/051,208, filed on Sep. 16, 2014, and incorporated herein in its entirety; and this application also claims the benefit of U.S. Provisional Patent Application Ser. No. 61/938,497, filed on Feb. 11, 2014 and incorporated herein in its entirety; and this application also claims the benefit of U.S. Provisional Patent Application Ser. No. 62/051,644, filed on Sep. 17, 2014 and incorporated herein in its entirety; and this application also claims the benefit of U.S. Provisional Patent Application Ser. No. 62/051,789, filed on Sep. 17, 2014 and incorporated herein in its entirety.

STATEMENT REGARDING FEDERALLY SPONSORED RESEARCH

This invention was made with government support under DE-SC0004993/T-106808 awarded by the Department of Energy. The government has certain rights in the invention.

FIELD OF THE INVENTION

The present invention relates to solar fuels generation, and more particularly, to reduction of chemical components for solar fuels generation.

BACKGROUND

Solar fuels generators can be used to convert sunlight into a fuel that can be stored for later use. One example of a solar fuel reduces $CO_2$ so as to generate an organic fuel. However, there are multiple different fuels that can be generated from $CO_2$ reduction. Examples of organic fuels that can be generated from $CO_2$ reduction include methane, methanol, ethanol, propanol, butanol, and glucose. During $CO_2$ reduction, the chemical reactions that generate these different fuels compete with one another. As a result, it is difficult to generate a particular organic fuel from $CO_2$ reduction. For instance, it is often desirable to generate methane from $CO_2$ reduction. However, the methane is often chemically generated at elevated temperatures. At the temperatures increase, the selectivity of for reducing $CO_2$ to methane decreases making methane generation even less efficient. Further, the generation of these fuels from $CO_2$ reduction is associated with high overpotentials and kinetic barriers. As a result, there is a need for a platform that allows efficient conversion of $CO_2$ to a particular one of the fuels.

SUMMARY

Carbon dioxide is bonded with an activator so as to form an intermediate. An electrical potential is applied to the intermediate so as to reduce the $CO_2$ in the intermediate. The $CO_2$ is reduced such that an organic fuel is generated and the activator is released from the intermediate.

An electrode at which the $CO_2$ is reduced can have an active layer on an electrode base. The active layer includes a polymer that includes one or more reaction components selected from a group consisting of a $CO_2$ reduction catalyst and the activator. The electrode can be included in a $CO_2$ reduction device such as a solar fuels generator or an electrolysis device.

The disclosure provides a device, comprising: a $CO_2$ reduction electrode having an active layer on an electrode base, the active layer including a polymer that includes one or more reaction components selected from a group consisting of a $CO_2$ reduction catalyst and an activator that bonds $CO_2$ so as to form a $CO_2$ reduction intermediate. In one embodiment, the polymer includes the activator and the $CO_2$ reduction catalyst. In another embodiment, the polymer includes sidechains and at least a portion of the one or more reaction components are included in the sidechains. In still another embodiment, the polymer is cross-linked. In one embodiment, the polymer includes the activator and the activator is a carbene. In a further embodiment, the polymer includes the activator and the activator is an N-heterocyclic carbene. In one embodiment, the polymer includes the activator and the activator is an amine. In another embodiment, the polymer includes the activator and the activator is an amine. In yet another embodiment, the polymer includes the catalyst and the catalyst is organometallic. In one embodiment, the active layer has a thickness less than 1 micron. In another embodiment, the polymer is represented by the following Formula I:

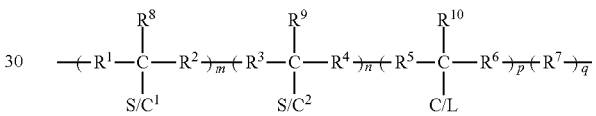

wherein m is greater than or equal to 0; n is greater than or equal to 0; p is greater than or equal to 0; q is greater than or equal to 0; at least m or n is greater than 0; $S/C^1$ represents a first sidechain that includes the catalyst, $S/C^2$ represents a second sidechain that includes the activator; C/L represents a cross-linker that is bonded to the backbone of another polymer chain represented by Formula I or to another location on backbone represented by Formula I; $R^1$, $R^2$, $R^3$, $R^4$, $R^5$, $R^6$, $R^7$ each represents nil, an alkylene, alkylene oxide, alkenylene, alkenylene oxide, bivalent ether, bivalent carbonate, arylene, bivalent amine, bivalent ester, or bivalent silane, $R^9$, and $R^{10}$ each represent $S/C^1$, $S/C^2$, C/L, a hydrogen, or halogen. In a further embodiment, m and n are each greater than 0. In yet a further embodiment, p is greater than 0. In yet still a further embodiment, m is greater than 0 and the $S/C^1$ the catalyst is an organometallic. In another embodiment n is greater than 0 and the activator is selected from a group consisting of amines and carbenes. In one embodiment, m and n are each greater than 0, the catalyst is an organometallic and the activator is selected from a group consisting of amines and carbenes. In one embodiment, p and q are each greater than 0. In one embodiment, the electrode is included in a solar fuels generator. In another embodiment, the electrode is included in an electrolysis device. In yet another embodiment, the active layer is a barrier between $O_2$ and the electrode base. In one embodiment, the active layer is a barrier between a liquid electrode and the electrode base. In one embodiment, the active layer is patterned. In a further embodiment, the pattern includes features with dimensions less than 100 microns. In one embodiment, the pattern is defined by recesses extending into the active layer or through the active layer. In a further embodiment, a second $CO_2$ reduction catalyst is located in the recesses. In yet a further embodiment, the $CO_2$ reduction catalyst is not included in the polymer. In one embodiment, a second activator is located in the recesses. In one embodiment, the active layer includes a nanoparticle that acts as a second $CO_2$ catalyst.

BRIEF DESCRIPTION OF THE FIGURES

FIG. 3A is a perspective view of the electrode.

FIG. 3B is a cross section of the electrode shown in FIG. 3A taken along the line labeled B in FIG. 3A.

FIG. 6A is a cross section of the solar fuels generator.

FIG. 6B is a sideview of the solar fuels generator shown in FIG. 6A taken looking in the direction of the arrow labeled V in FIG. 6A.

DETAILED DESCRIPTION

Figure 1:
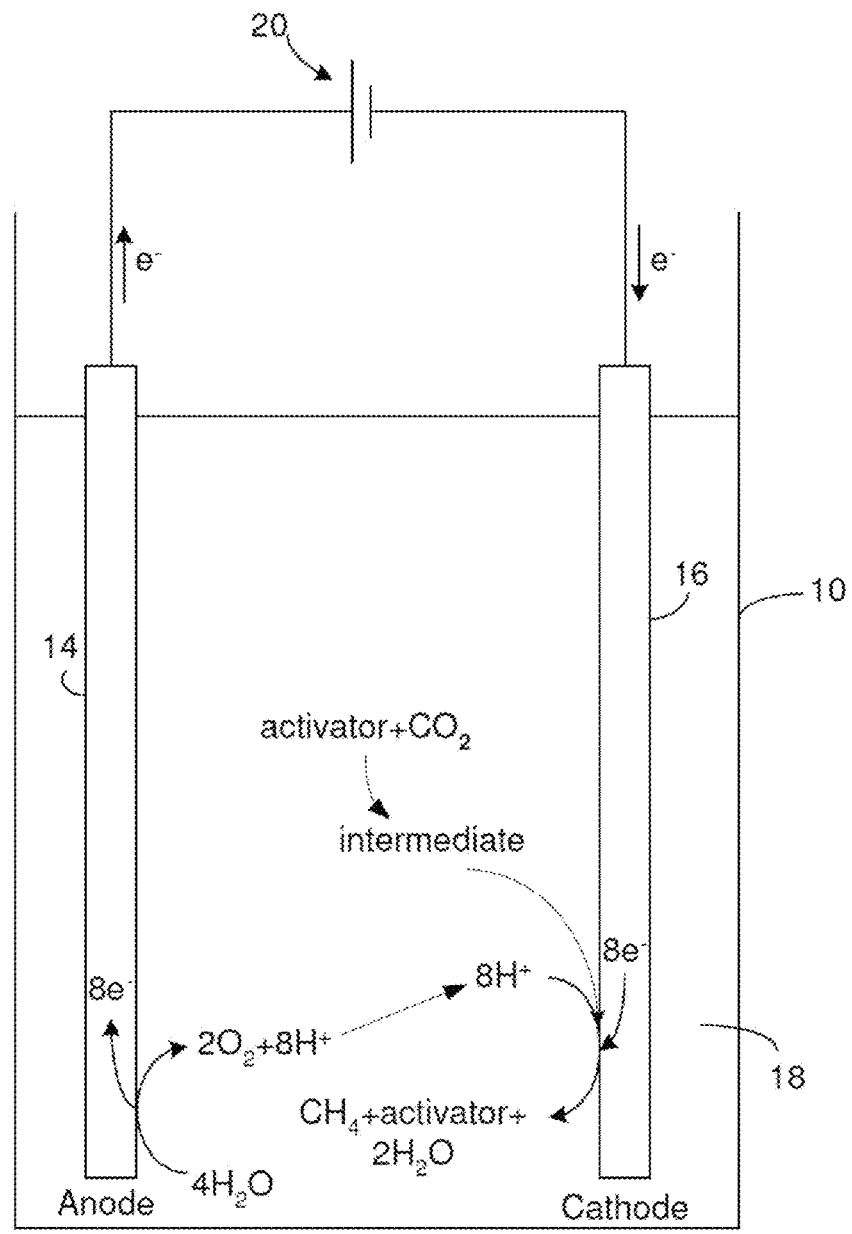
FIG. 1 illustrates an electrolysis system as an example of a $CO_2$ reduction device.

As used in this specification and the appended claims, the singular forms "a," "an," and "the" include plural referents unless the content clearly dictates otherwise.

Unless defined otherwise, all technical and scientific terms used herein have the same meaning as commonly understood by one of ordinary skill in the art to which the invention pertains. Although any methods and materials similar or equivalent to those described herein can be used in the practice for testing of the invention(s), specific examples of appropriate materials and methods are described herein.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

All publications mentioned herein are incorporated herein by reference in full for the purpose of describing and disclosing the methodologies, which are described in the publications, which might be used in connection with the description herein. The publications discussed above and throughout the text are provided solely for their disclosure prior to the filing date of the present application. Nothing herein is to be construed as an admission that the inventors are not entitled to antedate such disclosure by virtue of prior disclosure.

Carbon dioxide is generally a linear compound that can coordinate with an activator so as to form an intermediate having the $CO_2$ in a bent configuration. An electrical potential is then applied to the intermediate under conditions that cause the $CO_2$ to be reduced and released from the activator as a reduced fuel such that the activator is recovered. The $CO_2$ reduction generates an organic fuel that depends on the selection of the activator. For instance, an activator can be selected that results in the generation of methane gas. The use of the activator in the $CO_2$ reduction is surprisingly and unexpectedly selective for the desired fuel. For instance, organic products that result from competing $CO_2$ reduction reactions are not substantially generated. Further, hydrogen from the competing hydrogen generating reactions is also not substantially generated. Without being bound to theory, this result may be a function of the bent $CO_2$ causing the activation energy of the $CO_2$ reduction to drop far enough below the activation energy of the competing reactions that the targeted reaction becomes dominant. Additionally or alternately, the reduction of the $CO_2$ included in the intermediate may occur by a different mechanism that excludes competing reactions.

The activators can be used in $CO_2$ reduction devices such as solar fuels generators and electrolysis systems. These devices can operate on a liquid electrolyte in which the $CO_2$ is dissolved. The fuel that is generated in these devices can be a gas such as methane. Since the gaseous fuel is formed in the liquid electrolyte, the fuel can form bubbles that exit from the liquid electrolyte. As a result, the process of separating the product from the other system components is simplified.

The activator can be included in a liquid electrolyte along with other reaction components such as $CO_2$ reduction catalysts. Additionally or alternately, a $CO_2$ reduction device can include one or more $CO_2$ reduction electrodes that include an active layer having a polymeric medium. The polymeric medium can include a polymer that constrains the activator and/or $CO_2$ a reduction catalyst. The active layers provide a platform for constraining the activator and/or catalyst near the surface of the electrode at which the $CO_2$ reduction occurs. Further, the active layer can protect the underlying portions of the electrode from an electrolyte in which the electrode is positioned. As an example the active layer can protect the underlying portions of the electrode from highly acidic electrolytes. Additionally or alternately, the active layer can protect the underlying electrode from competing reactions such as $O_2$ reduction and/or can protect the electrode from highly acidic environments. Accordingly, the active layer can increase the service life of the electrode.

Additionally, the disclosed $CO_2$ reduction technology may have surprising environmental benefits. Carbenes and amines are examples of materials that may be suitable for use as activators. Many of these materials are currently used to bond carbon dioxide in $CO_2$ scrubbers. Once $CO_2$ is bonded to these materials in scrubbing technology, the resulting product is considered waste that must be destroyed or stored. However, this waste product may be a suitable intermediate for use in the disclosed $CO_2$ reduction. As a result, the disclosed technology can provide an application for these waste products and may also provide a method of recovering the original material for use in a scrubber.

As noted above, $CO_2$ reduction can be used to generate a variety of different hydrocarbon fuels. The reaction pathways associated with the reduction of $CO_2$ can be represented by the following generalized reaction: $mCO_2 + n H_2O \rightarrow C_M H_2 n O_{(2M+N-2P)} + p O_2$ where m, n, and p are non-negative numbers and, in some instances, are integers; $C_M H_2 NO_{(2M+N-2P)}$ represents the fuel produced in this reaction and $CO_2$ serves as the reactant that is delivered to the photocathodes. This reaction illustrates that in some instances, the organic fuels generated by $CO_2$ reduction include or consist of carbon, hydrogen, and, in some instances oxygen. For instance, this reaction can produce fuels such as methanol, methane, ethanol, formic acid, acetic acid, ethanol, propanol, 1,3 propanediol, 2-oxybutyric acid, butanol, and glucose. Accordingly, the generated fuels can be a gas such as methane or a liquid such as ethanol. When trying to use this reaction to generate a particular fuel, the reactions that generate different fuels compete with one another. For instance, the reaction can be used to generate methane gas (i.e., m=1, n=2, p=2). When using an electrolysis device, the reaction at the cathode during the generation of methane can be illustrated as: $CO_2 + 8H^+ + 8e^- \rightarrow CH_4 + 2H_2O$; however, the reactions that generate other fuels will compete with the generation of methane. Further, hydrogen gas generation will also compete with the methane generation. A chemical platform is presented for selectively targeting the generation of particular fuels from $CO_2$ reduction.

The $CO_2$ reduction is performed in the presence of various reaction components. Examples of reaction components include catalysts and activators. Catalysts can be used to reduce the activation energy associated with $CO_2$ reduction. $CO_2$ is a linear molecule; however, activators can coordinate with the $CO_2$ so as to bend the $CO_2$ and/or make the $CO_2$ non-linear. For instance, an activator can bond with the $CO_2$ so as to form a $CO_2$ adduct with the $CO_2$ in a non-linear configuration. In some instances, the activator causes the $CO_2$ to be bent at an angle greater than 110°. The $CO_2$ adduct can act as an intermediate compound in the reduction of $CO_2$. In some instances, the activators are pre-activators in that the activator coordinates with the $CO_2$ before the $CO_2$ is subject to catalytic activity.

In some instances, the carbon in $CO_2$ covalently bonds with the activator. Carboxylates and carboxylic acids are examples of $CO_2$ adducts that can be formed from $CO_2$ and an activator. As an example, the result of the activator bonding with the $CO_2$ can be a carboxylate where the $CO_2$ takes on a non-linear configuration such as

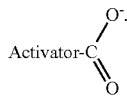

In some instances, the intermediate is zwitterionic in that the intermediate is neutral but has one or more positive charges and one or more negative charges.

Since $CO_2$ is an electrophile, nucleophiles can serve as the activator. An example of suitable activator includes carbenes such as acyclic carbenes and cyclic carbenes. Example carbenes include, but not are not limited to, imidazoles and imidazole-based carbenes. The carbene can be a N-heterocyclic carbene. An example N-heterocyclic carbene can be represented by

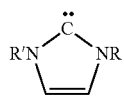

where R represents a hydrogen, halogen, or an organic moiety and R' represents a hydrogen, halogen, or an organic moiety. For instance, the N-heterocyclic carbene can be 1,3-bis(2,6-diisopropylphenyl)imidazolium. The N-heterocyclic carbene can bond with $CO_2$ to from zwitterionic imidozolium carboxylates. An example zwitterionic imidozolium carboxylates can be represented by

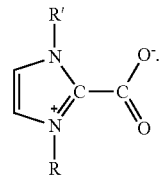

For instance, the zwitterionic imidozolium carboxylates can be 1,3-bis(2,6-diisopropylphenyl)imidazolium carboxylate.

Other examples of activators include, but are not limited to, amines such as ethanolamine, 2-amino-2-methyl-1-propanol, diethanolamine, piperazine, methyldiethanolamine, diisopropanolamine, 2-(2-aminoethoxyl)ethanol. These materials bond with $CO_2$ to form carbamates and/or carboxylic acids that include the $CO_2$ in a bent or non-linear configuration. For instance, these materials can bond with $CO_2$ to form N-carbamate amine-$CO_2$ adducts. As an example, an amine can be represented by

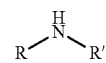

where R represents a hydrogen, halogen, or an organic moiety and R' represents a hydrogen, halogen, or an organic moiety, and at least one of R and R' represents an organic moiety. The amine can bind the $CO_2$ so as to form a carbamate represented by

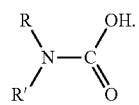

The hydrogen in the amine serves as the source of the hydrogen illustrated in the carbamate.

Other examples of suitable activators include, but are not limited to, hydroxide ($OH^-$) and alkoxides ($RO^-$). These activators also bind and bend $CO_2$. For instance, hydroxide anions react with carbon dioxide in a similar fashion to amines and N-heterocyclic carbenes to form bicarbonate anions intermediates such as

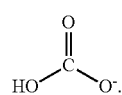

The use of hydroxide as an activator may of particular interest in the field of solar fuels, as several of the proposed solar-fuel devices involve aqueous conditions in basic media due to limitations on the anodic side chemistry of a solar-fuel device. Basic alkoxide anions react with carbon dioxide in a similar fashion to amines and N-heterocyclic carbenes to form alkylcarbonate anion intermediates such as

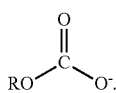

The use of hydroxide as an activator may be particular interest in the field of solar fuels, as several of the proposed solar-fuel devices involve aqueous conditions in basic media, which may contain alkoxides as bases to preactivate and bind $CO_2$ to form organic carbonates.

Another example of a suitable class of activators includes N-Heterocyclic Olefins (NHO) such as

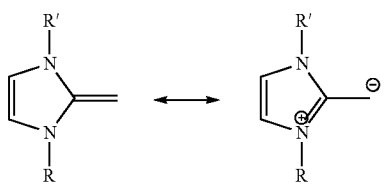

where R represents a hydrogen, halogen, or an organic moiety and R' represents a hydrogen, halogen, or an organic moiety. N-Heterocyclic Olefins have been shown to be sufficiently Lewis-basic to react and bend $CO_2$ to form $CO_2$ adduct intermediates such as

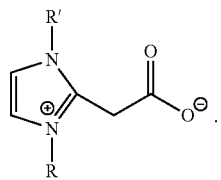

Other examples of suitable activators include nucleophilic bases that bond $CO_2$ in a bent configuration.

The activator and $CO_2$ can be dissolved in a liquid electrolyte. When the activator is a carbene, suitable solvents for the electrolyte include, but are not limited to, organic solvents such as methylene chloride, dimethylformamide, acetonitrile, tetrahydrofuran, and benzonitrile and mixtures of these solvents. In some instances, water can serve as a solvent for a carbene activator or can be included in the solvent. When the activator is an amine, suitable solvents for the electrolyte include, but are not limited to, water, ionic liquids, methylene chloride, dimethylformamide, acetonitrile, tetrahydrofuran, and benzonitrile and mixtures thereof. Amines are generally more soluble in water than carbenes and accordingly provide an improved opportunity for the use of aqueous electrolytes.

The activator and solvent can be selected such that the $CO_2$ and activator spontaneously form the intermediate in the electrolyte. For instance, carbenes such as the N-heterocyclic carbene represented by

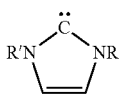

can react spontaneously in the liquid electrolyte to form the carboxylate intermediate. N-carbamate amine-$CO_2$ adducts form spontaneously upon exposure of the amine to $CO_2$ in a liquid electrolyte or in a gas.

As will be discussed in more detail below, the activator represented by

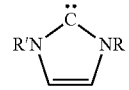

is highly selective for the generation of methane gas; however, other activators will be selective for other fuels. Accordingly, the activator can be selected so as to generate the desired fuel.

Other reaction components include, but are not limited to, catalysts such as $CO_2$ reduction catalysts. Example $CO_2$ reduction catalysts include, but are not limited to, metals such as Fe, Co, Ni, Cu, Ag, Au, Sn, Mo, Ir, Pt, Ru, Ti, Zr, Ta, Mg, Li, Hg, Al and Zn. $CO_2$ reduction catalysts can include these metals in coordination complexes such as organometallics. Organometallics are coordination complexes where the ligands are organic and/or "organic-like" as in the case of ligands such as phosphines, hydride, and CO. In some instances, the organometallic catalysts have organic ligands. As an example, ferrocene is an organometallic material that includes iron and serves as a $CO_2$ reduction catalyst. Examples of organometallic materials that can functions as $CO_2$ reduction catalysts include, but are not limited to, $[Co^{III}N_4H(Br)_2]^+$ where $N_4H$=2,12-dimethyl-3,7,11,17-tetraazabicyclo-[11.3.1]-heptadeca-1(7),2,11,13,15-pentaene, Mn(bpy-Bu)(CO)$_3$Br where bpy represents 2,2' bipyridine, Re(bpy)(CO)$_3$Br where bpy represents 2,2' bipyridine, [Ni(cyclam)]$^{2+}$ where cyclam represents 1,4,8,11-tetraazatetracyclodecane, $[Co^IL]^+$ where L represents 5,7,7,12,14,14-hexamethyl-1,4,8,11-tetraazacyclotetradeca-4,11-diene; [Ru(bpy)$_2$(CO)$_2$]$^{2-}$, where bpy represents 2,2' bipyridine, TPPFeCl where TPP represents tetraphenylporphyrin, FeTDHPPCl where TDHPP represents 5,10,15,20-tetrakis(2',6'-dihydroxyphenyl)-porphyrin, FeTDMPPCl where TDMPP represents 5,10,15,20-tetrakis(2',6'-dimethoxyphenyl)-porphyrin; CoTPP where TPP represents tetraphenylporphyrin; [($\eta^5$-Me$_5$C$_5$)M(bpy) Cl] M=Ir, Rh where bpy represents 2,2' bipyridine, [Pd$_2$(CH$_3$CN)$_2$(eHTP)](BF$_4$)$_2$ where eHTP represents [(Et$_2$PCH$_2$CH$_2$)$_2$PCH$_2$P(CH$_2$CH$_2$PEt$_2$)$_2$], and Pd(triphosphine)(CH$_3$CN)](BF$_4$)$_2$.

One system for the generation of hydrocarbon fuels is an electrolysis system. FIG. 1 provides an example of an electrolysis operated as a $CO_2$ reduction device. The system includes a vessel 10 having a reservoir. Anodes 14 and cathodes 16 are positioned in the reservoir such that anodes 14 and cathodes 16 alternate with one another. The anodes 14 and cathodes 16 are parallel or substantially parallel with one another. The electrolyte 18 is positioned in the reservoir such that anodes 14 and the cathodes 16 are in contact with the electrolyte 18. Suitable anodes include, but are not limited to, fluorine doped tin oxide film on glass, a titanium foil current collector, Fe, Co, Ni, Cu, Ag, Au, Sn, Mo, Ir, Ru, Pt, Ti, Zr, Ta, Mg, Li, Hg, Al and Zn and their respective oxides. Suitable cathodes include, but are not limited to, glassy carbon, carbon foam, reticulated vitreous carbon, carbon cloth, carbon felt or Fe, Co, Ni, Cu, Ag, Au, Sn, Mo, Ir, Ru, Pt, Ti, Zr, Ta, Mg, Li, Hg, Al and Zn. Alternative cathode constructions are disclosed below. The cathode and anode are connected to a voltage source 20 that is sufficient to apply the overpotential needed to cause the illustrated electrolysis. The voltage source can be any voltage source such as a photovoltaic voltage source, battery or other electronics.

The $CO_2$ is dissolved in the electrolyte. Additionally, one or more of the reaction components can be included in the electrolyte. For instance, one or more activators and/or one or more catalysts can be dissolved in the electrolyte solvent. Alternately, the one or more of the reaction components can be confined or substantially confined at the surface of the cathode. For instance, one or more activators and/or one or more catalysts can be confined at the surface of the cathode. Alternately, one or more reaction components can be confined or substantially confined at the surface of the cathode and one or more other reaction components can be dissolved in the electrolyte. For instance, one or more activators can be dissolved in the electrolyte solvent and one or more catalysts can be confined at the surface of the cathode.

During operation of the electrolysis system, the voltage source 20 generates a voltage between the one or more anodes and the one or more cathodes so as to drive an electrical current through the electrolyte. The resulting electrical potentials drive the illustrated reactions. For the purposes of illustration, FIG. 1 illustrates the electrolysis system generating $CH_4$ in an aqueous electrolyte. The $CO_2$ dissolved in the electrolyte reacts with the activator so as to form an intermediate such as a $CO_2$ adduct. As noted above, in some instance, the activator is selected such that the coordination of the $CO_2$ with the activator is spontaneous and reversible in the electrolyte. At the anode, water is oxidized so as to generate protons that are transported through the electrolyte to the cathode. At the cathode, the intermediate, electrons from the cathode and protons from the electrolyte combine so as to generate the methane. The activator is released from the intermediate in response to the reduction on the $CO_2$ in the intermediate. The methane is generated as a gas and can form bubbles in the electrolyte. The methane gas can exit from the electrolyte and enter the atmosphere over the electrolyte.

Although FIG. 1 illustrates the electrolysis system used to generate methane, the electrolysis system can be used to generate other fuels by changing the activator. Additionally, water is illustrated as the proton source in the electrolyte, however, when the electrolyte includes one or more organic solvents, a proton source can be added to the electrolyte. Suitable proton sources include, but are not limited to, methanol, water, protic ionic liquids confined at the electrode or in liquid phase, protonated amines, mineral acids and mixtures thereof. One or more proton source can be added to an aqueous electrolyte.

A variety of electrolysis experiments illustrate the fuel selectivity that can be achieved through the use of activators. The electrolysis experiments were performed using a variety of different liquid electrolytes that included organic solvents. The electrolytes each included at least two components selected from the group consisting of catalyst, intermediate, proton source, and $CO_2$. The intermediate was based on an activator selected to generate methane. The results are presented in the following Table 1. A voltage of −1.5V was applied to the electrolytes during the electrolysis experiments. The contents of the gaseous volume above the electrolyte were analyzed to identify the products produced, the faradic efficiency of production, and the moles of product produced. The first and second electrolytes both included the intermediate and the catalyst and both produced methane at Faradaic efficiencies of greater than 90%. The remaining catalysts did not include both the catalyst and activator and either failed to produce methane at all or produced methane at very low levels. Electrolytes that excluded the activator failed to produce methane. Further, some of the electrolytes produced hydrogen gas much more efficiently than methane.

TABLE 1

| Electrolyte | Charge passed | Product | Faradaic efficiency | Moles of product |
|---|---|---|---|---|
| 1. Catalyst, intermediate, proton source, and $CO_2$ | 29 ± 6 C | $CH_4$ | 91 ± 4% | $3.3 \times 10^{-5}$ |
| 2. Catalyst, intermediate, proton source, and $N_2$ | 27 ± 5 C | $CH_4$ | 93 ± 2% | $3.2 \times 10^{-5}$ |
| 3. Intermediate, proton source, and $N_2$ | 8 ± 5 C | $H_2:CH_4$ (12:1) | 80 ± 7% | $4.1 \times 10^{-6}$: $7.2 \times 10^{-6}$ |
| 4. Catalyst, intermediate, and $N_2$ | 10 ± 7 C | CO | 78 ± 10% | $4.0 \times 10^{-5}$ |
| 5. Catalyst, proton source, and $N_2$ | 9 ± 7 C | $H_2$, CO | 72 ± 12% | $1 \times 10^{-5}$: $2.2 \times 10^{-5}$ |
| 6. Catalyst, proton source, and $N_2$ | 5 ± 2 C | n/a | n/a | n/a |

Figure 2:
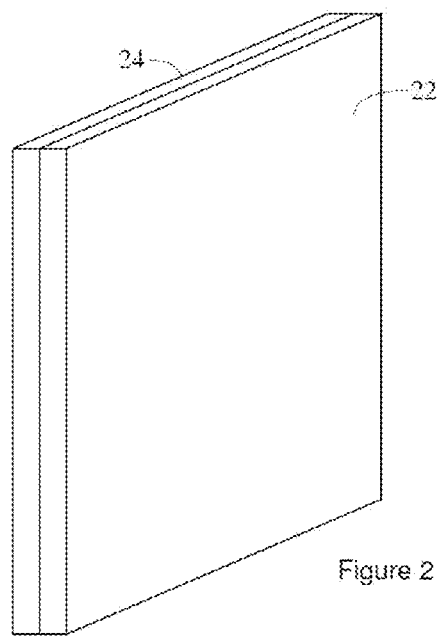
FIG. 2 is a perspective view of an electrode having an active layer on an electrode base.

FIG. 2 is a perspective view of an electrode that includes an active layer 22 on an electrode base 24. The illustrated electrode is suitable for use as a cathode in the electrolysis system disclosed above. The active layer 22 includes, consists of, or consists essentially of a polymeric medium that confines one or more reaction components. For instance, the polymeric medium can include one or more polymers that are bonded to the activator and/or $CO_2$ reduction catalyst. Alternately, the activator and/or $CO_2$ reduction catalyst can be entrapped within the polymeric medium without being covalently bonded to a polymer in the polymeric medium. In some instances, all or a portion of the one or more reaction components are covalently bonded to a polymer within the polymeric medium. Accordingly, the polymeric medium can include the one or more reaction components. Examples of reaction components include, but are not limited to, catalysts and activators.

The active layer 22 is immobilized on the electrode base 24. For instance, the polymeric medium can be bonded directly to the electrode base 24. Alternatively, the active layer 22 is immobilized on the electrode base 24 through other means such as physisorption. In some instances, the active layer 22 is immobilized on the electrode base 24 as a result of the polymeric medium being covalently bonded to the electrode base 24.

The electrode base 24 represents the portion of the electrode having a traditional electrode construction. Alternately, the electrode base 24 represents the portion of the electrode having a traditional electrode construction but with a prior active layer removed from the electrode. Accordingly, the active layer 22 can be added to a prior art electrode or can replace an active layer 22 on a prior art electrode.

The electrode base 24 can be a current collector such as a metal foil or sheet, mesh, or conducting fabric. As will become evident from the below illustration of a solar fuels generator, the electrode base 24 can be or include a semiconductor layer. Although the electrode base 24 is shown as a single layer of material, the electrode base 24 can include multiple layers of material. For instance, the electrode base 24 can include one or more layers of active material on a current collector. In instance where the electrode is employed to reduce $CO_2$, the electrode operates as a cathode. During fabrication of the electrode, in some instances, the electrode base serves as the support for the catalyst layer. Accordingly, the catalyst layer can optionally be formed directly on the electrode base.

Although the active layer 22 is illustrated as being located on one side of the electrode base 24, the active layer 22 can be located on both sides of the electrode base. Additionally or alternately, FIG. 2 illustrates the active layer 22 being located on the electrode base 24; however, the electrode base 24 can be embedded in the active layer 22. For instance, electrode base 24 can be a mesh that is embedded in the active layer 22.

Figure 3B:
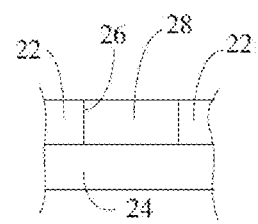
FIG. 3A and FIG. 3B illustrate an electrode having a patterned active layer.
Figure 3A:
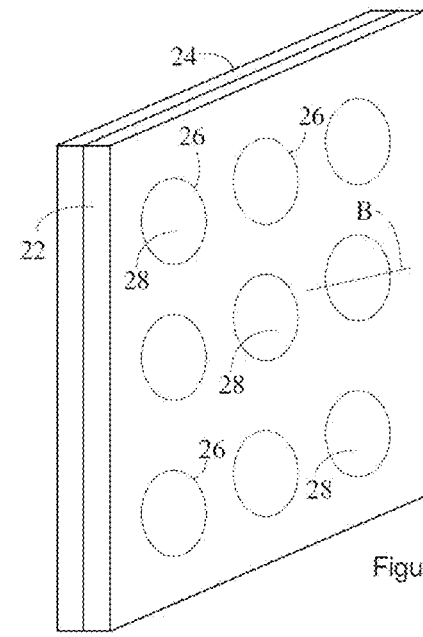

Although FIG. 2 illustrates the active layer 22 as a continuous layer of material, the active layer 22 can be patterned. For instance, recesses that extend into the active layer 22 can define the pattern in the active layer 22. The recesses can be channels in or through the active layer 22, openings in or through the active layer 22. In some instances, the recessed form regions of the active layer 22 that are not continuous with one another such as would occur when the active layer 22 is arranged in islands on the electrode base. The pattern can be a regular or periodic pattern or can be a random pattern. A medium can be located in the recesses. The medium can include, consists of, or consist essentially of all or a portion of the one or more reaction components. As an example, FIG. 3A and FIG. 3B illustrate an electrode where openings extend through the active layer 22. FIG. 3A is a perspective view of the electrode. FIG. 3B is a cross section of the electrode shown in FIG. 3A taken along the line labeled B in FIG. 3A. A medium 28 is located in the recesses. The medium includes, consists of, or consists essentially of all or a portion of the one or more reaction components. For instance, the medium 28 can include, consist of, or consist essentially of all or a portion of the one or more catalysts included in the active layer 22 and/or the one or more activators included in the active layer 22. The polymeric medium can exclude any reaction components and all of the reactions components can be located in the medium. Alternately, the polymeric medium can confine a portion of the reaction components and the medium can include, consist of, or consist essentially of a different portion of the reaction components. As an example, the polymeric medium can include a catalyst and the medium can include, consist of, or consist essentially of one or more activators. When the medium and the polymeric medium each includes one or more catalysts, the one or more catalysts in the medium and the one or more catalysts in the polymeric medium can be the same or different. When the medium and the polymeric medium each includes one or more activators, the one or more activators in the medium and the one or more activators in the polymeric medium can be the same or different. Suitable methods for placing the medium 28 in the recesses that define the pattern include, but are not limited to, electroplating, electrolysis, surface initiated polymerization, thermal deposition, plasma deposition, chemical vapor deposition, atomic layer deposition. The medium in the recesses can include components other than catalysts and activators. For instance, the medium in the recesses can include binders, diluents, conductors, optical scattering elements, stabilizers, membranes, barriers, reagents, fluidic channels.

During operation, the electrode is typically in physical contact with the electrolyte. The electrolyte can be a solid or a liquid. When the electrolyte is a liquid, the electrolyte can be absorbed in the active layer 22. For instance, the polymeric medium can be hygroscopic and the electrolyte can be absorbed and/or adsorbed by the polymeric medium. In some instances, the absorption and/or adsorption causes swelling of the active layer 22 and causes the active layer 22 to be a gel phase. A suitable thickness for the active layer 22 includes, but is not limited to, a thickness less than 1 micron, 100 nanometers, 10 nanometers and/or greater than 1 nanometer, 10 nanometers, 100 nanometers.

During operation of the electrode, electrons from the electrode base 24 interact with components in the active layer 22 and/or in the electrolyte. The active layer 22 can be electrically conductive but need not be. When the active layer 22 is electrically conductive, the active layer 22 readily conducts the electrons to the components in the active layer 22 and/or in the electrolyte. When the active layer 22 is not electrically conductive the active layer 22 can be thin enough to permit tunneling. For instance, the active layer 22 can be thin enough to permit tunneling of the electrons to the components in the active layer 22 and/or in the electrolyte. When tunneling is desired in the active layer 22, a suitable thickness for the active layer 22 includes, but is not limited to, a thickness less than 50 nanometers, 10 nanometers, 5 nanometers, or 1 nanometer.

During organic fuel generation, the oxygen can be reduced at the cathode. The oxygen reduction is a parasitic reaction that compromises the fuel generation. The active layer can have a thickness selected such that the active layer reduces access of oxygen in the electrolyte to the surface of the electrode base. As a result, the active layer can act as a barrier to oxygen reduction in that the oxygen cannot pass through the barrier to contact the electrode base. An active layer thickness that allows the active layer to reduce or prevent oxygen reduction at the cathode includes, but is not limited to, an active layer thickness greater than greater than 0.5 nanometer, 1 nanometer, 10 nanometers, 100 nanometers.

During use of the electrode for $CO_2$ reduction, the electrode is typically exposed to an acidic electrolyte. For instance, an electrolyte used in $CO_2$ reduction can have a pH less than 7, 5, or even 3 although higher pH levels are possible. Prior electrodes have not been tolerant of these pH levels; however, the active layer 22 has proven to be highly tolerant of acidic electrolytes and has accordingly extended the working life of these electrodes. For instance, in some instances, the active layer can be thick enough to act as a barrier between the electrolyte and the electrode base in that the electrolyte cannot pass through the barrier to contact the electrode base. Increasing the thickness of the active layer 22 has provided increased electrode protection. An active layer 22 thickness that can provide protection from an acidic electrolyte includes, but is not limited to, a thickness greater than 0.5 nanometer, 1 nanometer, 10 nanometers, 100 nanometers. Accordingly, when tunneling is desired in the active layer 22 and the electrode is exposed to an acidic electrolyte, the active layer 22 can have a thickness greater than 0.5 nanometer, 1 nanometer, 10 nanometers, nanometers and/or less than less than 50 nanometers, 10 nanometers, 5 nanometers, or 1 nanometer.

The electrodes illustrated in FIG. 2 through FIG. 3B can serve as the cathode in the electrolysis system disclosed in the context of FIG. 1. In these instances, an electrolyte can be included in the active layer and/or in the electrolyte. Additionally or alternately, an activator can be included in the active layer and/or in the electrolyte. FIG. 1 illustrates the activator and intermediate being present in the electrolyte. However, when the activator is included in an electrode constructed according to FIG. 2 through FIG. 3B, the intermediate is formed in the active medium and the activator is released in the active medium in response to reduction of $CO_2$ in the intermediate. Accordingly, there need not be a substantial concentration of the activator and/or intermediate in the electrolyte.

The polymeric medium can include, consist or, or consist essentially of one or more polymers. In some instances, the one or more polymers are amorphous. Suitable polymers for inclusion in the polymeric mediums include polymers with organic backbones, silane backbones, or siloxane backbones. For instance, the polymer backbone can include one, two, three, or four components selected from the group consisting of carbon, oxygen, nitrogen, and silicon. The repeating units in the backbone can be saturated or unsaturated. In some instances the repeating units in the backbone are unsaturated. The repeating units in the backbone can be linear or cyclic or can include linear and/or cyclic segments. Examples of the polymer include polymers having a backbone that includes or consists of a poly(alkylene), a poly(alkylene oxide), a poly(alkenylene), poly(alkenylene oxide), a poly(carbonate), poly(heteroalkylene), and poly(hydrocarbylene). The backbone can be a copolymer that has a backbone that includes at least two different repeating units selected from the group consisting of alkylenes, alkylene oxides, alkenylenes, alkenylene oxides, and carbonates. The copolymer can be alternating, statistical, random, periodic, or block. In some instances, the polymer backbone is not saturated. Accordingly, all or a portion of the repeating units in the backbone can include double bonds. For instance, all or a portion of the repeating units in the polymer can include one or more carbon-carbon double bonds.

The polymer is preferably cross linked in that at least a portion of the repeating units are bonded to a cross-linker that is linked to at least two different backbones although a portion of the cross-linkers can be linked to the same backbone in two or more different locations. In some instances, the cross-linkers are covalently bonded to at least two different backbones. Suitable cross linkers are organic cross-linkers. For instance, the cross-linkers can include or consist of carbon and one or more components selected from the group consisting of oxygen, nitrogen, hydrogen, and halogens. In some instances, the cross linker includes or consists of alkylenes, alkylene oxides, alkenylenes, alkenylene oxides, bivalent ethers, and bivalent carbonates. For instance, the cross linker can include or consist of poly(alkylene)s, poly(alkylene oxide)s, a poly(alkenylene)s, poly(alkenylene oxide)s, poly(carbonate)s, and polysiloxanes. These cross-linkers can be linear or cyclic or can include linear segments and cyclic segments. Additionally or alternately, these cross-linkers can be substituted or unsubstituted. Further, these cross-linkers can be fully or partially halogenated or can exclude halogens. In some instances, the cross-linker includes or consists of a reaction component. For instance, a cross-linker can include an organometallic $CO_2$ reduction catalyst, or an activator. In some instances, the polymer becomes more rigid as the percentage of the backbone atoms that are linked to cross-linkers increases. In some instances, more than 1%, 10%, or 50% of the atoms in the backbone of the polymer are linked to a cross-linker.

The atoms in a backbone can also be linked to one or more sidechains that are not cross-linkers in that they are linked to only one backbone. Suitable sidechains include or consist of organic sidechains and/or organometallic sidechains. For instance, the sidechains can include or consist of carbon and one or more components selected from the group consisting of oxygen, nitrogen, hydrogen, halogens, and metals. The metals included in the sidechains can be selected from the group consisting of Fe, Co, Ni, Cu, Ag, Au, Sn, Mo, Ir, Pt, Ru, Ti, Zr, Ta, Mg, Li, Hg, Al and Zn. In some instances, the sidechains includes or consists of alkylenes, alkylene oxides, alkenylenes, alkenylene oxides, bivalent ethers, and bivalent carbonates. For instance, a sidechain can include or consist of poly(alkylene)s, poly(alkylene oxide)s, a poly(alkenylene)s, poly(alkenylene oxide)s, poly(carbonate)s, and polysiloxanes. These sidechains can be linear or cyclic or can include linear segments and cyclic segments. Additionally or alternately, these sidechains can be substituted or unsubstituted. Further, these sidechains can be fully or partially halogenated or can exclude halogens. In some instances, the sidechains include or consist of a reaction component. For instance, the sidechains can include or consist of an organometallic $CO_2$ reduction catalyst, and/or an activator.

The backbone atoms that are not linked to sidechains or cross-linkers can be linked to hydrogens, halogens, or terminal groups.

One example of the polymer can be represented by the following Formula I:

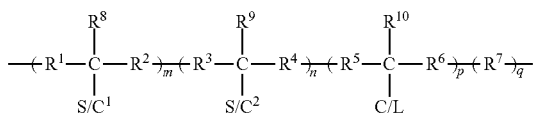

wherein m is greater than or equal to 0; n is greater than or equal to 0; p is greater than or equal to 0; q is greater than or equal to 0, $S/C^1$ represents a sidechain that includes or consists of a catalyst, $S/C^2$ represents a sidechain that includes of consists of an activator; C/L represents a cross-linker that is bonded to the backbone of another polymer chain represented by Formula I or to another location on backbone represented by Formula I; $R^1$, $R^2$, $R^3$, $R^4$, $R^5$, $R^6$, $R^7$ each represents nil, an alkylene, alkylene oxide, alkenylene, alkenylene oxide, bivalent ether, bivalent carbonate, alkyl, aryl, amine, ester, silane, and can all be the same, can all be different, or some can be the same and some different; $R^8$, $R^9$, and $R^{10}$, each represent $S/C^1$, $S/C^2$, C/L, a hydrogen, halogen, and can all be the same, can all be different, or some can be the same and some different. $S/C^1$, $S/C^2$, C/L can each be an organic moiety. For instance, $S/C^1$, $S/C^2$, C/L can include an alkylene, alkylene oxide, alkenylene, alkenylene oxide, bivalent ether, bivalent carbonate, alkyl, aryl, amine, ester, silane. C/L can include or consist of an alkylene, alkylene oxide, alkenylene, alkenylene oxide, bivalent ether, bivalent carbonate, alkyl, aryl, amine, ester, silane.

In some instances, m, n, and p are each greater than 0. In some instances, m or p is 0. Suitable ratios of m+n+q:p include, but are not limited to, ratios greater than 0.2, 0.5, 1, or 2. One or more of the terminal groups for the polymer chain can also be $S/C^1$, $S/C^2$ or C/L. When any of $R_1$-$R_{10}$ represents an organic moiety, all or a portion of $R_1$-$R_{10}$ can be linear or cyclic or can include linear and/or cyclic segments. Additionally or alternately, when $R_1$-$R_{10}$ represents an organic moiety, all or a portion of $R_1$-$R_{10}$ can be substituted or unsubstituted and/or can be fully or partially halogenated or can exclude halogens. Although a strict interpretation of Formula I results in a block copolymer, Formula I can represent an alternating, statistical, random, periodic, or block. The repeating units in Formula may each represent a monomer residual but do not need to represent a monomer residual. In some instances, m+n+p is greater than 10, 100, or 1000 and/or less than 10000, 1000, 100. Additionally or alternately, the ratio of m:n or m+p:n can be greater than 1, 10, 100 and/or less than 1, 0.1, 0.01 The polymer represented by Formula I can include repeating units in addition to the repeating units illustrated in Formula I or can be limited to the repeating units illustrated in Formula I.

An example of a polymer according to Formula I is provided in the following Formula II:

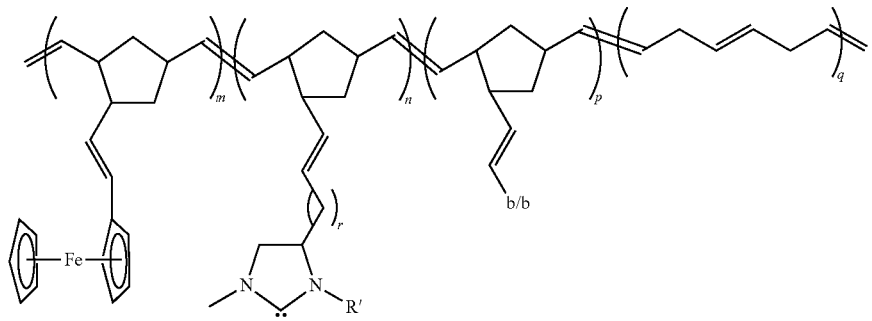

where r is greater than or equal to 0. In this polymer, S/C¹ includes ferrocene as a catalyst, S/C² includes an N-heterocyclic carbene as an activator, and C/L is a cross-linker where b/b represents the backbone of another polymer chain represented by Formula I or II or represents another location on backbone represented by Formula II. Although the terminal groups are not illustrated, one or more of the terminal groups can each be S/C¹, S/C², or C/L. The backbone is unsaturated and the repeating units include alkenylenes. Formula II illustrates that the alkenylenes disclosed above can have one or more olefin groups.

Figure 4A:
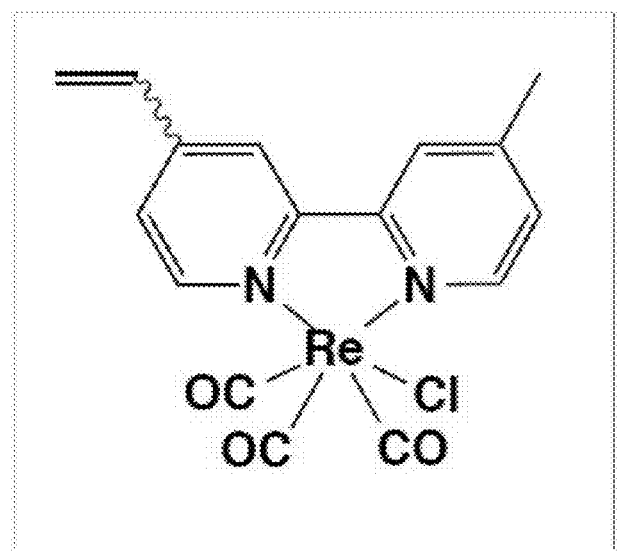
FIG. 4A illustrates a precursor for a sidechain that includes a catalyst.

The polymer can be generated using common polymer synthesis technologies such as olefin metathesis. When the polymer is generated by olefin metathesis, the sidechains (S/C¹ and S/C²) can be added by cross metathesis. For instance, the reactive components to be included in the polymer can include a terminal olefin, can be included in a compound with a terminal olefin or can be modified to include a tether with a terminal olefin. The resulting compounds operate as sidechain precursors that cross metathesize with olefins on the polymer. As an example of a sidechain precursor, consider that ferrocene is disclosed above as a catalyst. Vinyl ferrocene includes the ferrocene with a tether having a terminal olefin and can accordingly serve as a sidechain precursor for a sidechain that includes ferrocene as a catalyst. FIG. 4A illustrates another example of a catalyst with a tether having a terminal olefin that can serve as a sidechain precursor for a sidechain that includes a catalyst. As an example for a sidechain that includes an activator, note that the N-heterocyclic carbene represented by

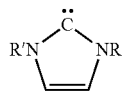

has been disclosed as an activator. The compound represented by represented by

Figure 4B:
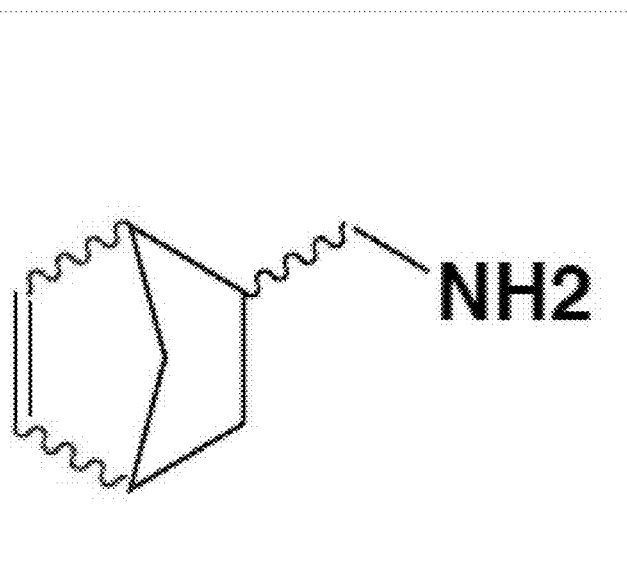
FIG. 4B illustrates a precursor for a sidechain that includes an activator.

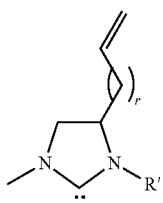

includes an embodiment of this N-heterocyclic carbene with a tether having a terminal olefin. Accordingly, this compound can serve as a sidechain precursor for a sidechain that includes an N-heterocyclic carbene as an activator. FIG. 4B illustrates another example of an activator with a tether having a terminal olefin that can serve as a sidechain precursor for a sidechain that includes an activator. A variety of organic compounds that include two or more olefins can serve as cross-linker precursors. The cross-linker precursors can include all or a portion of the cross-linker that is included in the polymer. An example of a suitable cross-linker precursor includes, but is not limited to, 5-ethylidene-2-norbornene.

Figure 5:
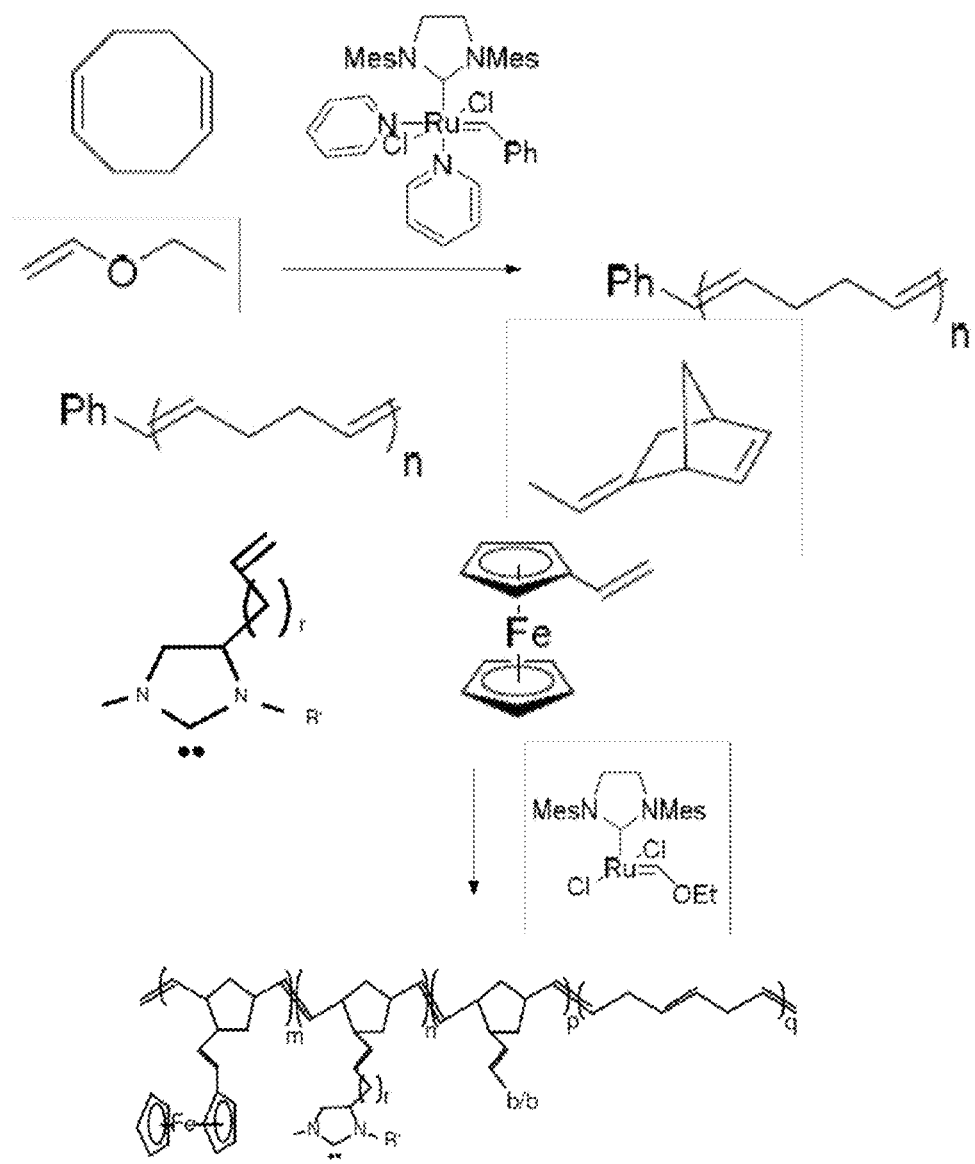
FIG. 5 illustrates the precursors for a polymer to be included in the active layer of an electrode.

FIG. 5 illustrates the polymer of Formula II generated using a ring opening metathesis polymerization (ROMP). Cyclooctadiene and ethyl vinyl ether are reacted in the presence of an olefin metathesis catalyst to form a first monomer for the polymer. The reaction is a ring opening reaction where the ethyl vinyl ether serves as a quencher. In a second reaction, 5-ethylidene-2-norbornene serves as a second monomer. The first monomer and the second monomer are polymerized in the presence of a second metathesis catalyst. The polymerization occurs in the presence of vinyl ferrocene sidechain precursor and the N-heterocyclic carbene sidechain precursor activator represented by

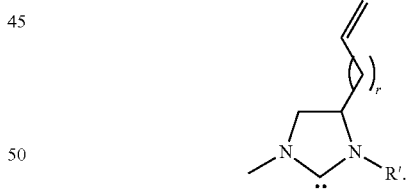

The terminal olefins in these sidechain precursors cross metathesize with an olefin in the 5-ethylidene-2-norbornene to form the sidechains illustrated in the Formula II polymer. Additionally, an olefin an 5-ethylidene-2-norbornene that is part of the polymer can cross metathesize with a 5-ethylidene-2-norbornene included in a second polymer chain to form the cross-linker.

Suitable catalysts for the metathesis polymerization and the ring opening metathesis polymerization (ROMP) include, but are not limited to, metathesis catalysts. Examples of these catalysts include, but are not limited to, the Grubbs catalysts and ruthenium complexes.

Although the polymer for the active layer is disclosed as having the one or more reaction components each included in a side chain, the one or more reaction components can be included in a cross-linker and/or in the backbone.

Although the polymer for the active layer is disclosed in the context of a polymer that includes catalyst and activator, the polymer can exclude the catalyst and/or the activator. For instance, the polymer can include the catalyst and the activator can be present at another location in the system such as the electrolyte. Alternately, the polymer can include the activator and the catalyst can be present at another location in the system.

As noted above, the active layer 22 of the electrode includes, consists of, or consists essentially of one or more of the polymers. The one or more polymers can be generated directly on the electrode base 24 in order to immobilize the polymeric medium on the electrode base 24 or to attach the polymeric medium to the electrode based. When the active layer 22 is to be patterned, the polymerization can occur through a photomask and the polymerization catalyst can be photoactivatable. A positive photoactivatable metathesis catalysts catalyze metathesis when activated by light but do not provide substantial catalytic activity when dark and a negative photoactivatable metathesis catalyst would catalyze metathesis when dark but not when light is incident on the catalyst. An example of a positive photoactivatable metathesis catalyst is represented by

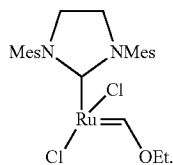

When a polymerization reaction is carried out in a medium having a positive photoactivatable metathesis catalysts, the polymer is formed in the portions of the medium that are illuminated with an appropriate light source but are not substantially formed in the dark portions of the medium. Accordingly, when the medium is illuminated through the photomask, the pattern of the photomask is transferred to the medium after the unpolymerized portion of the medium is removed (development). As a result, a patterned polymeric medium can be generated by generating the polymer in the presence of a photoactivatable catalyst that is illuminated through a photomask. This methodology can be employed to generate an active layer having features smaller than 100 microns, 10 microns or 1 micron. Accordingly, the active layer 22 on an electrode can have features with dimensions smaller than 100 microns, 10 microns or 1 micron. Examples of these dimensions include, but are not limited to, horizontal or lateral dimensions when the active layer is sitting on a flat and horizontal surface such as diameters, widths, lengths.

The above discussion of the $CO_2$ reduction catalyst is largely directed to the use of molecular catalysts; however, nanoparticles can also serve as $CO_2$ reduction catalyst. For instance, nanoparticles that include Fe, Co, Ni, Cu, Ag, Au, Sn, Mo, Ir, Pt, Ru, Ti, Zr, Ta, Mg, Li, Hg, Al and Zn can serve as a $CO_2$ reduction catalysts. Nanoparticles are particles between 1 and 1000 nanometers in size. In some instances, the nanoparticles are inorganic. The nanoparticles can be included in the active layer. For instance, the nanoparticles can be covalently bonded directly to one or more polymers within the polymeric medium using known polymer generation methods and known interfacial chemistries. For example, ligands bound to the nanoparticle surfaces can be crosslinked into a polymer matrix. Alternately, the nanoparticles can be entrapped within the polymeric medium without being covalently bonded to any of the polymers included within the polymeric medium. For instance, the nanoparticles can be located in pores within the polymeric medium.

Figure 6A:
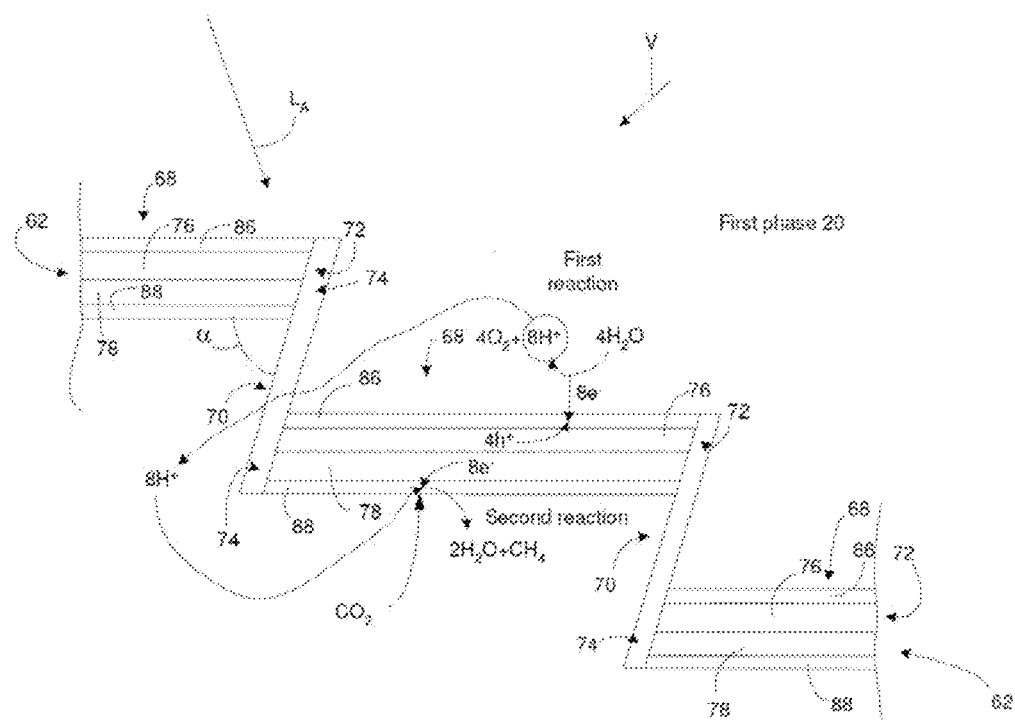
FIG. 6A and FIG. 6B illustrates a solar fuels generator that includes an electrode constructed according to FIG. 2 or FIG. 3A through FIG. 3B.
Figure 6B:
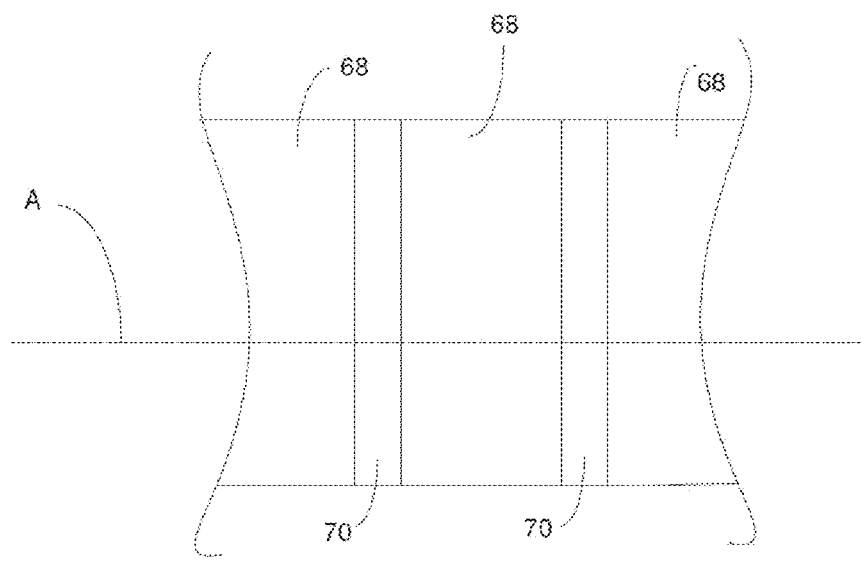

The electrode can be incorporated into other devices such as a solar fuels generator. FIG. 6A is a cross section of a solar fuels generator. FIG. 6B is a sideview of the solar fuels generator shown in FIG. 6A taken looking in the direction of the arrow labeled V in FIG. 6A. The cross section shown in FIG. 6A can be taken along the line labeled A in FIG. 6B.

The solar fuels generator includes a barrier 62 between a first phase 64 and a second phase 66. The barrier 62 includes or consists of one or more potential generation components 68 and one or more separator components 70. FIG. 6A illustrates the potential generation components 68 linked with separator components 70 so as to form the barrier 62 between the first phase 64 and the second phase 66. The potential generation components 68 are alternated with the separator components 70. Each potential generation component 68 contacts both the first phase 64 and the second phase 66 and each separator component 70 contacts both the first phase 64 and the second phase 66. The barrier 62 is formed such that the first phase 64 can be maintained at a different chemical composition than the second phase 66. For instance, the barrier 62 can be impermeable or substantially impermeable to nonionic atoms and/or nonionic compounds.

The potential generation components 68 include anodes 72 and cathodes 74. As illustrated by the arrow labeled $L_A$ and $L_C$, light is incident on the anodes 72 and/or cathodes 74 during operation of the solar fuels generator. The anodes 72 and cathodes 74 convert the received light into excited electron-hole pairs that drive a chemical reaction such as electrolysis of water. The anodes 72 include an anode light absorber 76 selected to absorb light at a wavelength to which the anodes 72 will be exposed during operation of the solar fuels generator. Additionally, the cathodes 74 include a cathode light absorber 78 selected to absorb light at a wavelength to which the cathodes will be exposed during operation of the solar fuels generator.

Suitable materials for the anode light absorbers 76 and the cathode light absorbers 78 include, but are not limited to, semiconductors. In some instances, the anode light absorbers 76 include or consist of a semiconductor and/or the cathode light absorbers 78 include or consist of a semiconductor. The bandgap of the semiconductors included in the anode light absorbers 76 can be larger than the bandgap of the semiconductors included in the cathode light absorbers 78. Suitable semiconductors for the anode light absorbers 76 include, but are not limited to, metal oxides, oxynitrides, sulfides, and phosphides that are stable in an oxidizing environment such as $WO_3$, $TiO_2$, and TaON. Suitable semiconductors for the cathode light absorbers 78 include, but are not limited to, p-type silicon, InP, $Cu_2O$, GaP, and $WSe_2$.

In some instances, the anode light absorbers 76 and/or the cathode light absorbers 78 are doped. The doping can be done to form one or more pn junctions within the anode light absorbers 76 and the cathode light absorbers 78. For instance, the anode light absorber 76 can be an n-type semiconductor while the cathode light absorber 78 can be a p-type semiconductor. A pn junction can also be present within either the cathode light absorbers 78 or the anode light absorber 76 or both, and is arranged so that electrons flow from the cathode light absorber 78 to a reduction catalyst (discussed below) and holes flow from the anode light absorber 76 to an oxidation catalyst (discussed below).

The dashed lines at the interface of the anode light absorber 76 and the cathode light absorber 78 illustrate an interface between the materials of the anode light absorber 76 and the cathode light absorber 78. However, the anode light absorber 76 and the cathode light absorber 78 can be the same material and/or include the same dopant. As a result, an anode light absorber 76 and the interfaced cathode light absorber 78 can be a continuous block of material. In these instances, the dashed lines shown in FIG. 6A may represent a feature that is not discernable in the solar fuels generator. One example of a material that can serve as both the anode light absorber 76 and the cathode light absorber 78 is p-type silicon, which can function as the absorber on both the anode and cathode. In particular, p-type silicon is a candidate for the cathode material because it is cathodically stable under illumination in acidic aqueous media and in conjunction with various metal catalysts can evolve $H_2$ (g) from $H_2O$.

Other possible choices for the light anode light absorber 76 and/or the cathode light absorber 78 include semiconductors having wider bandgaps than silicon that are stable in a water vapor medium such as oxide semiconductors. Some of the oxide semiconductors that can be used as a light absorber include, but are not limited to: tandem structure anodes, including tungsten oxide ($WO_3$), bismuth vanadium oxide ($BiVO_4$), tantalumoxynitride (TaON), and titanium oxide ($TiO_2$); tandem structure cathodes, including silicon (Si), cuprous oxide (Cu2O), gallium phosphide (GaP), gallium arsenide (GaAs), and indium phosphide (InP); single material electrodes, including strontium titanate ($SrTiO_3$), strontium niobate ($SrNbO_3$), and titanium oxide ($TiO_2$); multijunction photovoltaics, including triple junction amorphous silicon (a-Si), and vertically stacked epitaxially grown III-V semiconductors with tunnel junctions; and series connected photovoltaics, including silicon (Si) cells, gallium arsenide (GaAs) cells, cadmium telluride (CdTe) cells, and Copper Indium Gallium Selenide (CIGS) thin film cells.

The absorption of light by the cathode light absorber 78 and the anode light absorber 76 generates the photovoltage that drive the $CO_2$ reduction and effectively acts as the voltage source of FIG. 1. When semiconductors are used for the cathode light absorber 78 and the anode light absorber 76, the achievable voltage depends on the choice of semiconductor materials, the associated bandgaps, and doping arrangements as is known in the solar cell arts. Accordingly, the material selections and arrangements can be selected to provide the desired voltage levels. For instance, tandem and multijunction structures in which two or more semiconductors in series add their voltages together can be used in order to achieve elevated voltages.

The anodes 72 include one or more oxidation catalyst layers 86 that each include or consist of one or more oxidation catalysts. One or more oxidation catalyst layers 86 can be in direct physical contact with the anode light absorber 76. As is evident from FIG. 6A, when light is to be incident on the anode, the light passes through one or more oxidation catalyst layers 86 before reaching the anode light absorber 76. As a result, the one or more oxidation catalyst layers 86 can be transparent and/or thin enough that the one or more oxidation catalyst layers 86 do not absorb an undesirably high level of the incoming light. A suitable thickness for an oxidation catalyst layer 86 includes, but is not limited to, a thickness less than 10 nm to a few micrometers.

The oxidation catalyst layer 86 and/or the oxidation catalyst can include, consist of, or consist essentially of a metal oxide that includes or consists of oxygen, cerium, and one or more second metals. In one example, the oxidation catalyst includes a metal oxide represented by $(La_vNi_w Co_yCe_z)O_x$ where $v+w+y+z=1$, v is greater than or equal to 0 and less than 1, w is greater than or equal to 0 and less than 1, y is greater than or equal to 0 and less than 1, and z is greater than or equal to 0 or greater than or equal to 0.1 and/or less than 1 or less than or equal to 0.8, x is greater than 0 or greater than or equal to 0.5 and/or less than or equal to 3, 2, or 1.6, and at least one, two, three or four of v, w, y, and z is greater than 0. As an example, $(La_{0.1}Ni_{0.1}Co_{0.3}Ce_{0.5})O_x$ is suitable for use as the oxidation catalyst.

The cathodes 74 include one or more reduction layers 88. The active layer 22 disclosed above can serve as the reduction layer reduction layer 88 and the cathode light absorber 78 can serve as the electrode base 24 disclosed above. Accordingly, one or more of the reduction layers 88 can include, consist of, or consist essentially of the polymeric medium disclosed above and the polymeric medium can include, consist of, or consist essentially of one or more polymers that constrain one or more of the reaction components. Accordingly, the one or more reduction layers 88 include one or more of the catalysts and/or one or more of the activators.

When light is to be incident on the cathode, the light passes through one or more reduction layers 88 before reaching the cathode light absorber 78. As a result, the one or more reduction layers 88 can be transparent and/or thin enough that the one or more reduction layers 88 do not absorb an undesirably high level of the incoming light. A suitable thickness for a reduction layer 88 includes, but is not limited to, a thickness of about 1 nm, or 5 nm to 5 µm. In some instances, the catalyst layer 88 does not need to be transparent. For instance, the catalyst layer 88 need not be transparent if it is facing down (i.e., is away from the incident light source).

The one or more reduction layers 88 are positioned on a surface of the cathode light absorber 78 such that a line that is perpendicular to the surface extends from the surface through one or more of the reduction layers 88 before extending through the second phase 66. The one or more reduction catalyst layers can be positioned such that the one or more reduction catalyst layers are on more than 10%, 30%, 50%, 75%, or 90% of the surface of the cathode light absorber 78.

The separator components 70 include or consist of a separator 90 located between the first phase 64 and the second phase 66. The separator 90 is ionically conductive. In some instances, the separator 90 is cationically conductive while concurrently being sufficiently nonconductive to the other components of the first phase 64 and the second phase 66 that the first phase 64 and the second phase 66 remain separated from one another. For instance, in some instances, the separator 90 is cationically conductive and non-conductive or substantially non-conductive to nonionic atoms and/or nonionic compounds. In some instances, the separator 90 is cationically conductive while being non-conductive or substantially non-conductive to nonionic atoms and/or nonionic compounds and also to anions. Accordingly, the separator 90 can provide a pathway along which cations can travel from the first phase 64 to the second phase 66 without providing a pathway or a substantial pathway from the first phase 64 to the second phase 66 to one, two, or three entities selected from a group consisting of anions, nonionic atoms or nonionic compounds. In some instances, it may be desirable for the separator 90 to conduct both anions and cations. For instance, when the first phase 64 and/or the second phase 66 has elevated pH levels a separator 90 that conducts both anions and cations may be used. As a result, in some instances, the separator 90 conducts cations and anions but not nonionic atoms or nonionic compounds.

Additionally, the separator 90 should be able to exchange ions sufficiently to maintain a desired pH gradient and separate the reaction products sufficiently to prevent them from re-combining. A suitable separator 90 can be a single layer or material or multiple layers of material. Suitable materials for the separator 90 include, but are not limited to, ionomers and mixtures of ionomers. Ionomers are polymers that include electrically neutral repeating units and ionized repeating units. Suitable ionomers include copolymers of a substituted or unsubstituted alkylene and an acid such as sulfonic acid. In one example, the ionomer is a copolymer of tetrafluoroethylene and perfluoro-3,6-dioxa-4-methyl-7-octene-sulfonic acid. A suitable material having a structure according to Formula I is sold under the trademark NAFION®. NAFION® is an example of a material that is cationically conductive of cations but is not conductive of anions or nonionic atoms or nonionic compounds. Another suitable separator 90 includes NAFION® functionalized with one or more components selected from a group consisting of dimethylpiperazinium cationic groups, glass frits, asbestos fibers, block copolymer formulated layers, and poly(arylene ether sulfone) with quaternary ammonium groups.

During operation, the solar fuels generator is exposed to light such as sunlight, terrestrial solar illumination, AM1 solar radiation, or similar illumination having approximately 1 kilowatt per square meter of incident energy or less. These light sources can be unconcentrated or can be concentrated using known light concentration devices and techniques. In some instances, the solar fuels generator is oriented such that the light travels through the anodes before reaching the cathodes. When the anode light absorber 76 has a larger bandgap than the cathode light absorber 78, the anodes absorb higher energy (shorter wavelength) light and allow lower energy (longer wavelength) light to pass through to the cathodes. The cathodes can then absorb the longer wavelengths. Alternately, the light can be incident on both the anodes and the cathodes or can be incident on the cathodes before reaching the anodes.

The absorption of light by an anode light absorber 76 generates hole-electron pairs within the anode light absorber 76. The presence of an n-type anode light absorber 76 in the first phase 64 produces an electrical field that causes the holes to move to the surface of the anode light absorber 76 and then the surface of the oxidation catalyst layer 86 where the oxidation of water occurs as illustrated by the first reaction in FIG. 6A. The electrons generated in the anode light absorber 76 move toward the cathode light absorber 78 as a result of the electrical field.

The protons generated in the first reaction move from the oxidation catalyst layer 86 into the first phase 64. Since the separator 90 is cationically conductive, the protons move from the first phase 64 to the second phase 66 through the separator 90. A suitable thickness for the separator 90 is a thickness of about 100 nm to 1 μm or more. The second phase includes the $CO_2$ that is to be reduced. For instance, the first phase could include or consist of an electrolyte disclosed in the context of the electrolyte system or can have a different composition. The $CO_2$ and the protons in the second phase travel to the reduction layers 88.

The absorption of light by the cathode light absorber 78 generates hole-electron pairs within the cathode light absorber 78. The presence of a p-type cathode light absorber 78 in the second phase 66 produces an electrical field that causes the electrons within the cathode light absorber 78 to move to the surface of the cathode light absorber 78 and then into the reduction layers 88. As noted above, the one or more reduction layers 88 can include the one or more activators. As a result, the $CO_2$ that travels to the one or more reduction layers 88 can interact with the one or more activators so as to form an intermediate such as a $CO_2$ adduct. The electrons, protons, and intermediate react so as to generate at least the organic fuel and the activator. Although FIG. 6A illustrates methane as the generated fuel, the generation of other fuels is possible depending on the selection of the activator. The holes generated in the cathode light absorber 78 by the absorption of light move from the cathode light absorber 78 toward the anode light absorber 76 as a result of the electrical field and can recombine with the electrons from the anode light absorber 76. When the generated fuel is a gas, the generated fuel can bubble up through a liquid second phase and leave the second phase.

The first phase 64 is generally different from the second phase 66. For instance, the first phase 64 generally has a different chemical composition than the second phase 66. The first phase 64 and the second phase can both be a liquid. For instance, the first phase 64 can be a standing, ionically conductive liquid such as water.

The one or more oxidation catalyst layers 86 illustrated in FIG. 6A can include materials in addition to the oxidation catalyst. For instance, an oxidation catalyst layer 86 can include one or more components selected from a group consisting of electrically conductive fillers, electrically conductive materials, diluents, and/or binders.

A suitable method for forming oxidation catalyst layers 86 on the anode light absorber 76 includes, but is not limited to, electrodeposition, sputtering, electroless deposition, spray pyrolysis, and atomic layer deposition. Alternately, the catalyst layer 86 can be a catalytic layer formed directly on the anode light absorber 76 as described below. A suitable method for forming reduction layers 88 on the cathode light absorber 78 includes, but is not limited to, polymerizing the polymeric layer directly on the cathode light absorber 78. A suitable method for attaching the separator 90 to the anodes 72 and/or cathodes 74 includes, but is not limited to, clamping, lamination, sealing with epoxy or glue and the like.

EXAMPLES

Example 1

Controlled potential electrolysis (CPE) experiments were performed using an electrolysis device with a working chamber volume of 40 mL and a counter chamber volume of 20 mL within a total cell volume of 188.5 mL. Different electrolytes were prepared for different experiments. The electrolyte was prepared with a solvent having 0.2 M $nBu_4NBF_4$ solution in 60 mL of a 4:2 (v:v) methylene chloride/trifluoroethanol mixture. The solvent was saturated with $CO_2$. Some electrolytes included 466 mg of the 1,3-bis(2,6-diisopropylphenyl)imidazolium carboxylate (MW: 432.5 g/mol) serving as the intermediate. Some electrolytes included 3.4 mg $NiCyclamCl_2$ (MW: 320 g/mol) as a catalyst.

The electrolysis was performed at −1.5 V (vs $Ag/AgNO_3$) for two hours. After two hours, 10 mL of the headspace volume were sampled analyzed by an Agilent GC-TCD instrument. Faradaic efficiencies were calculated assuming an 8e⁻ transformation per mol of methane detected, a 2e⁻ transformation/$H_2$ detected and a 2e⁻ transformation/mol CO detected. The results are presented above in Table 1.

Example 2

Cyclic voltammograms were prepared for several different electrolytes. The cyclic voltammograms were collected at a glassy carbon working electrode (3 mm diameter, BASi) with a C rod counter electrode (99.999%, Strem). The cyclic voltammograms were recorded after rigorous exclusion of air via nitrogen purge. Data workup was performed on OriginPro v8.0988.

Several electrolytes were prepared in 5 mL $CH_2Cl_2$ (0.1 M $nBu_4NBF_4$) Each electrolyte included 0.5 mL trifluoroethanol as a proton source and 1.2 mM [Ni (cyclam)]$Cl_2$, as a catalyst. The first electrolyte excluded $CO_2$. The second electrolyte included $CO_2$ and an intermediate. The third electrolyte included the intermediate 1,3-bis(2,6-diisopropylphenyl)imidazolium carboxylate (MW: 432.5 g/mol) and excluded $CO_2$. The fourth electrolyte included the intermediate 1,3-bis(2,6-diisopropylphenyl)imidazolium carboxylate (MW: 432.5 g/mol) and included $CO_2$.

Figure 7:
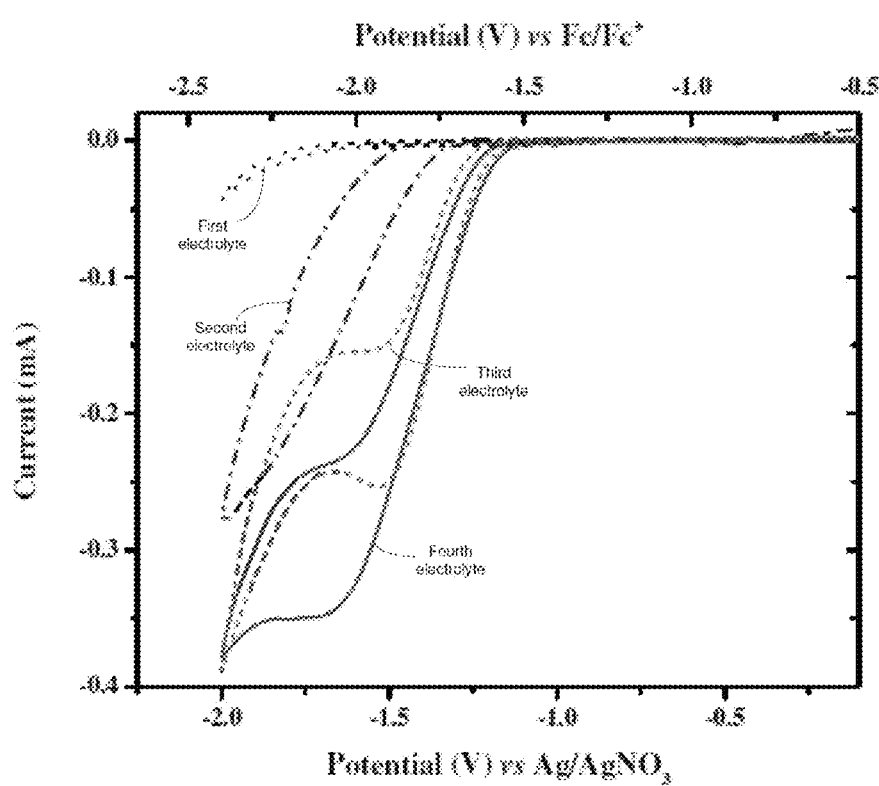
FIG. 7 illustrates cyclic voltammograms for a variety of different electrolytes.

The cyclic voltammograms that resulted from each of the different electrolytes are presented in FIG. 7. The first electrolyte showed little reduction current at electrode potentials positive of ca. −2.0 V. The addition $CO_2$ in the second electrolyte resulted in enhanced cathodic current at potentials negative of ca. −1.3V. In contrast, the presence of the intermediate in the third and fourth electrolyte yielded enhanced cathodic currents and distinct waves with peak potentials ranging from −1.5 to 1.7V vs (Ag/AgNO$_3$). The enhanced currents at more positive electrode potentials observed when the NHC—$CO_2$ carboxylate was present suggested a $CO_2$ reduction pathway different from what is observed with unreacted $CO_2$, and this hypothesis is confirmed by the Example 1 results.

Example 3

A cross-linked polymer was generated according to Formula with S/C¹ being a sidechain that included a catalyst according to FIG. 4A. The bis-pyridine olefin metathesis catalyst illustrated in FIG. 5 (1.3 mg) was placed under argon and dissolving in 2 mL dichloromethane. To this catalyst solution was quickly added 1.5 mL 1,5-cyclooctadiene, the solution became a semi-solid in 10 seconds and was allowed to react for 1 minute before quenching with 3 mL ethyl vinyl ether. The viscous solution was slowly stirred for 5 minutes, sealed under argon, and sonicated for 1 hour. The volatiles were removed on a rotary evaporator, to yield semisolid poly(COD), colored light yellow by the quenched catalyst (the photoactive vinyl ether complex). Ethylidene norbornene (10 mL) was added to this mixture, which was cooled to 0° C. and sonicated for 1 hour. The partially dissolved mixture was placed on an ice bath and stirred until fully dissolved, while allowing the bath to warm to room temperature. The result is a light yellow, viscous solution weighing approximately 10 grams ("First Solution").

The rhenium complex illustrated in FIG. 4A (3.0 mg) was added to a small vial and dissolved in 1.5 mL acetonitrile. A 100 microliter aliquot of this solution was added to 1 mL 5-ethylidene-2-norbornene, along with 100 microliters of the "First Solution." The result was spun at 7 k RPM for 60 sec and then irradiated for 2 minutes @ 254 nanometers. The result was rinsed in toluene to check for cross-linking.

Although the electrode and active layer are disclosed in the context of $CO_2$ reduction, the electrode and active layer can be used in other contexts. For instance, the polymer in the active layer can include catalysts for redox reactions other than $CO_2$ reduction and/or activators for reactions other than $CO_2$ reduction. As an example, the polymer in the active layer can include catalysts for olefin metathesis.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A device, comprising:
   a $CO_2$ reduction electrode having an active layer on an electrode base, the active layer including a polymer that includes one or more reaction components selected from a group consisting of a $CO_2$ reduction catalyst and an activator that bonds $CO_2$ so as to form a $CO_2$ reduction intermediate;
   wherein the polymer is represented by the following Formula I:

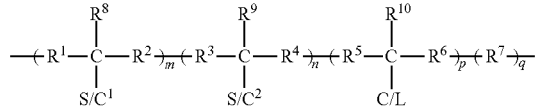

wherein m is greater than 0;
   n is greater than 0;
   p is greater than 0;
   q is greater than or equal to 0;
   S/C¹ represents a first sidechain that includes an organometallic $CO_2$ reduction catalyst,
   S/C² represents a second sidechain that includes the activator selected from the group consisting of a carbene or an anime;
   C/L represents a cross-linker that is bonded to the backbone of another polymer chain represented by Formula I or to another location on the backbone represented by Formula I;
   R¹, R², R³, R⁴, R⁵, R⁶, and R⁷ each represents nil, an alkylene, alkylene oxide, alkenylene, alkenylene oxide, bivalent ether, bivalent carbonate, arylene, bivalent amine, bivalent ester, or bivalent silane; and
   R⁹ and R¹⁰ each represent S/C¹, S/C², C/L, a hydrogen, or halogen.

2. The device of claim 1, wherein the polymer includes sidechains and at least a portion of the one or more reaction components are included in the sidechains.

3. The device of claim 1, wherein the activator is a carbene.

4. The device of claim 3, wherein the activator is an N-heterocyclic carbene.

5. The device of claim 1, wherein the activator is an amine.

6. The device of claim 1, wherein the active layer has a thickness less than 1 micron.

7. The device of claim 1, wherein is greater than 0.

8. The device of claim 1, wherein the electrode is included in a solar fuels generator.

9. The device of claim 1, wherein the electrode is included in an electrolysis device.

10. The device of claim 1, wherein the active layer is a barrier between $O_2$ and the electrode base.

11. The device of claim 1, wherein the active layer is a barrier between a liquid electrode and the electrode base.

12. The device of claim 1, wherein the active layer comprises a pattern.

13. The device of claim 12, wherein the pattern includes features with dimensions less than 100 microns.

14. The device of claim 12, wherein the pattern is defined by recesses extending into the active layer or through the active layer.

15. The device of claim 14, wherein a second $CO_2$ reduction catalyst is located in the recesses.

16. The device of claim 15, wherein the second $CO_2$ reduction catalyst is not included in the polymer.

17. The device of claim 14, wherein a second activator is located in the recesses.

18. The device of claim 1, wherein the active layer includes a nanoparticle that acts as a second $CO_2$ reduction catalyst.

\* \* \* \* \*